(12) United States Patent
Villarroel

(10) Patent No.: US 6,712,429 B2
(45) Date of Patent: Mar. 30, 2004

(54) LOST MOTION DUAL DISC SEAT RECLINER ASSEMBLY

(75) Inventor: Randolph P. Villarroel, Brampton (CA)

(73) Assignee: Intier Automotive Inc., Newmarket (CA)

(*) Notice: Subject to any disclaimer, the term of this patent is extended or adjusted under 35 U.S.C. 154(b) by 0 days.

(21) Appl. No.: 10/165,738

(22) Filed: Jun. 7, 2002

(65) Prior Publication Data

US 2003/0227205 A1 Dec. 11, 2003

(51) Int. Cl.$^7$ .................................. B60N 2/02
(52) U.S. Cl. ........................................ 297/361.1
(58) Field of Search ...................... 297/361.1, 374; 403/359.1, 359.3; 464/160

(56) References Cited

U.S. PATENT DOCUMENTS

| | | | |
|---|---|---|---|
| 2,348,071 A | * 5/1944 | Johnstone | 403/305 |
| 3,146,756 A | * 9/1964 | Shimanckas | 440/59 |
| 4,062,587 A | * 12/1977 | Wolters | 297/302.3 |
| 4,541,672 A | * 9/1985 | Fukuta et al. | 297/367 |
| 4,943,116 A | * 7/1990 | Ohwada et al. | 297/362 |
| 5,090,264 A | * 2/1992 | Droulon et al. | 74/411 |
| 5,967,611 A | * 10/1999 | York et al. | 297/368 |
| 5,984,564 A | * 11/1999 | Mitterreiter | 403/305 |

FOREIGN PATENT DOCUMENTS

DE          3346608 A1 *  7/1985

* cited by examiner

Primary Examiner—Peter M. Cuomo
Assistant Examiner—Joseph Edell
(74) Attorney, Agent, or Firm—Clark Hill PLC

(57) ABSTRACT

A dual recliner assembly for a seat assembly of an automotive vehicle for providing selective locking and pivotal adjustment of a seat back relative to a seat cushion between a plurality of reclined positions. The dual recliner assembly includes spaced apart outboard and inboard recliners each movable between a locked position to hold the seat back in one of the plurality of reclined positions and an unlocked position to allow pivotal movement of the seat back relative to the seat cushion between the plurality of reclined positions. Both the outboard and inboard recliners include respective outboard and inboard shafts for moving the outboard and inboard recliners between the locked and unlocked positions. A rod extends between an outboard end fixedly secured to the outboard shaft and an opposite inboard end coupled with the inboard shaft for moving the inboard recliner between the locked and unlocked positions in response to movement of the outboard recliner between the locked and unlocked position. The inboard end of the rod is axially slidably engaged with the inboard rod to accommodate variances in the relative positions between the outboard and inboard recliners due to build tolerances in the seat assembly and the vehicle.

10 Claims, 5 Drawing Sheets

LOST MOTION DUAL DISC SEAT RECLINER ASSEMBLY

BACKGROUND OF THE INVENTION

1. Field of the Invention

The invention relates to recliners for seats in automotive vehicles, and more particularly, to a lost motion joint operatively coupled between a dual recliner assembly to relieve internal stress within and ensure independent locking of each recliner.

2. Description of the Prior Art

Automotive vehicles include seat assemblies for supporting occupants within the vehicle. A seat assembly typically includes a seat cushion and seat back. Usually a recliner assembly is operatively coupled between the seat cushion and seat back for allowing selective pivotal adjustment of the seat back relative to the seat cushion between a plurality of reclined positions.

It is well known to provide a disc-type recliner assembly having an inner disc fixedly secured to the seat cushion and an outer disc fixedly secured to the seat back. The outer disc is rotatably coupled to the inner disc. An annular rim of teeth is formed on the outer disc. At least one pawl lockingly engagable with the rim of teeth in the outer disc is movably coupled to the inner disc for selective movement between locked and unlocked positions. The pawl is biased toward the locked position. In the locked position, the pawl is lockingly engaged with the rim of teeth to hold the seat back in any one of the plurality of reclined positions relative to the seat cushion. In the unlocked position, the pawl is disengaged from the rim of teeth to allow adjustment of the seat back between the plurality of reclined positions.

It is also common for a seat assembly to include dual recliner assemblies. Typically, a rod extends between the recliner assemblies for synchronizing movement of the pawls between the locked and unlocked positions. However, conventional dual recliner assemblies utilizing the rod are susceptible to dimensional variance in the seat assembly and vehicle body, which can result in internal stress between the moving parts within each recliner assembly and cause elevated recliner operating efforts.

It remains desirable to provide a dual recliner assembly that utilizes a rod for synchronizing the pawls and is less susceptible to dimensional variance in the seat assembly and vehicle body.

SUMMARY OF THE INVENTION

According to one aspect of the invention, a recliner assembly is provided for a seat assembly in an automotive vehicle for providing pivotal adjustment and selective locking of a seat back relative to a seat cushion between a plurality of reclined positions. The recliner assembly includes spaced apart outboard and inboard recliner mechanisms each selectively movable between a locked position to lock the seat back in one of a plurality of reclined seating positions and an unlocked position to allow pivotal movement of the seat back relative to the seat cushion between the plurality of reclined positions. Opposing outboard and inboard shafts extend axially from the outboard and inboard recliner mechanisms, respectively, for moving the outboard and inboard recliners between the locked and unlocked positions. A rod extends between the outboard and inboard shafts for moving the outboard and inboard recliner mechanisms together between the locked and unlocked positions. The rod is slidably engaged with at least one of the outboard and inboard shafts for accommodating variance in the relative positions between the outboard and inboard recliner mechanisms due to build tolerances in the seat assembly and the automotive vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
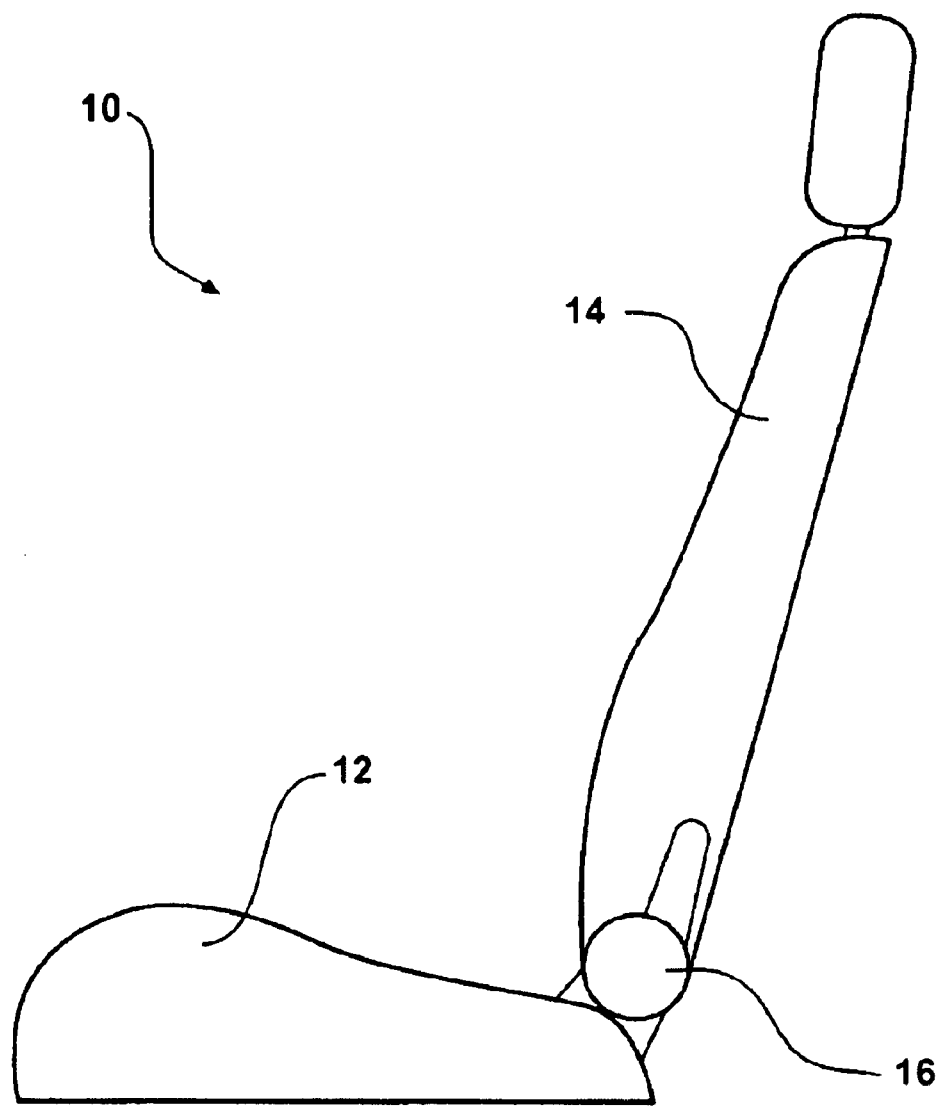
FIG. 1 is a side view of a seat assembly incorporating an embodiment of the invention.

Referring to the figures, a seat assembly incorporating an embodiment of the invention 10 is illustrated in FIG. 1. The seat assembly 10 includes a seat cushion 12 and a seat back 14. A recliner assembly 16 is operatively coupled between the seat cushion 12 and the seat back 14 for providing selective locking and pivotal adjustment of the seat back 14 relative to the seat cushion 12 between a plurality of reclined positions.

Figure 2:
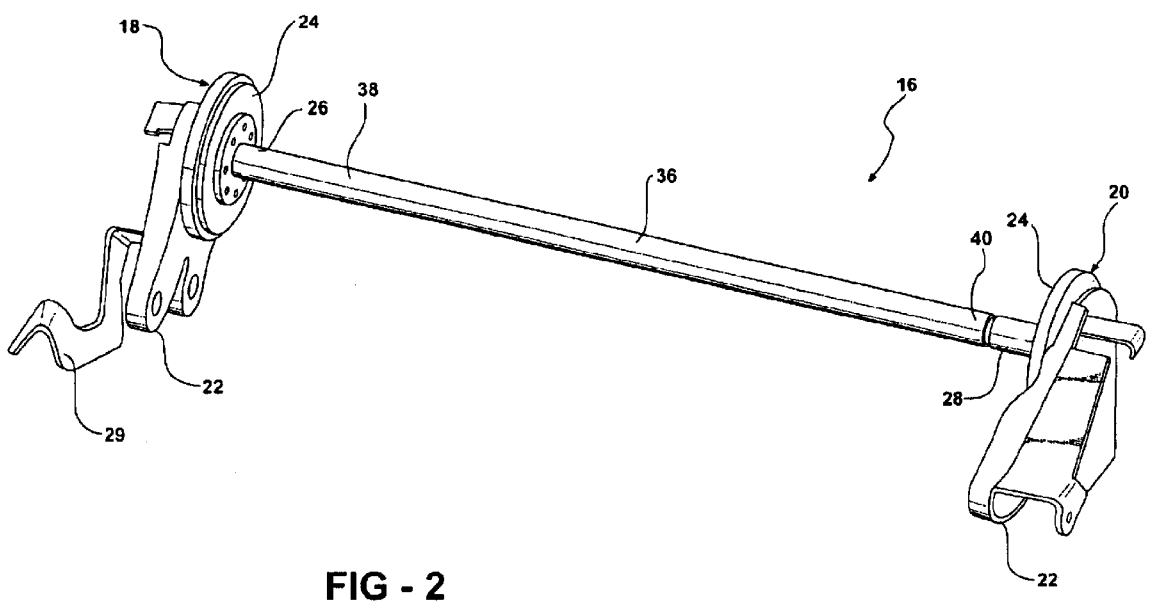
FIG. 2 is a perspective view of a recliner assembly according to the invention.

Referring to FIG. 2, the recliner assembly 16 includes spaced apart outboard and inboard recliners 18, 20. Preferably, the recliners 18, 20 are disc-type, but may be any suitable type of non-continuously engaged recliners as commonly known by those having ordinary skill in the art. Each recliner includes a fixed flange 22 fixedly secured to the seat cushion 12 and a mobile flange 24 fixedly secured to the seat back 14 and pivotally coupled to the fixed flange 22. A pawl (not shown) is movably mounted to each fixed flange 22 for movement between locked and unlocked positions. In the locked position, each pawl is lockably engaged with a respective annular rim of teeth (not shown) formed in each mobile flange 24 for locking the seat back 14 in any one of the plurality of reclined positions. In the unlocked position, each pawl is disengaged from the respective annular rim of teeth to allow pivotal movement of the seat back between the plurality of reclined positions. An internal biasing member (not shown) biases the pawl toward the locked position. Further detailed description and operation of the recliner 18, 20 is fully set forth in co-pending PCT application CA 99/00653, published Feb. 10, 2000, which is incorporated herein by reference in its entirety.

Figure 3:
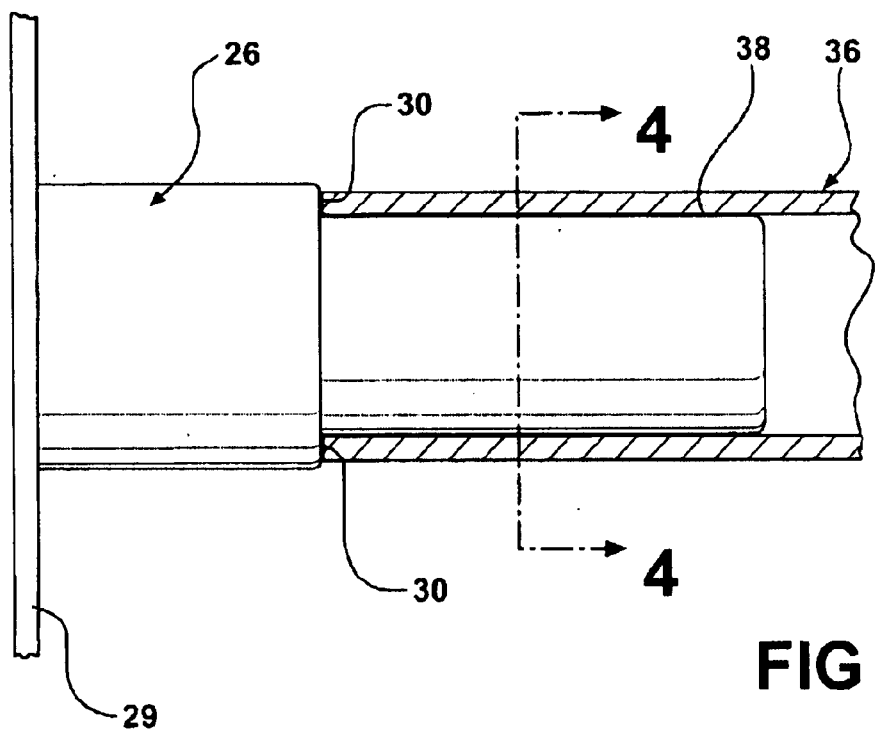
FIG. 3 is a partial cross sectional view of a rod and an outboard shaft in the recliner assembly.
Figure 4:
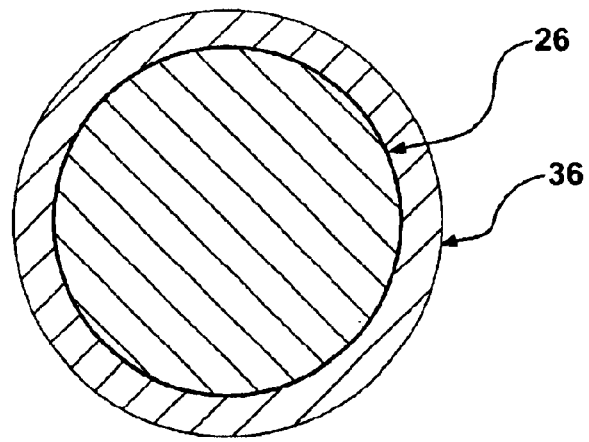
FIG. 4 is a partial cross sectional view of an outboard end of the rod and the outboard shaft.
Figure 5:
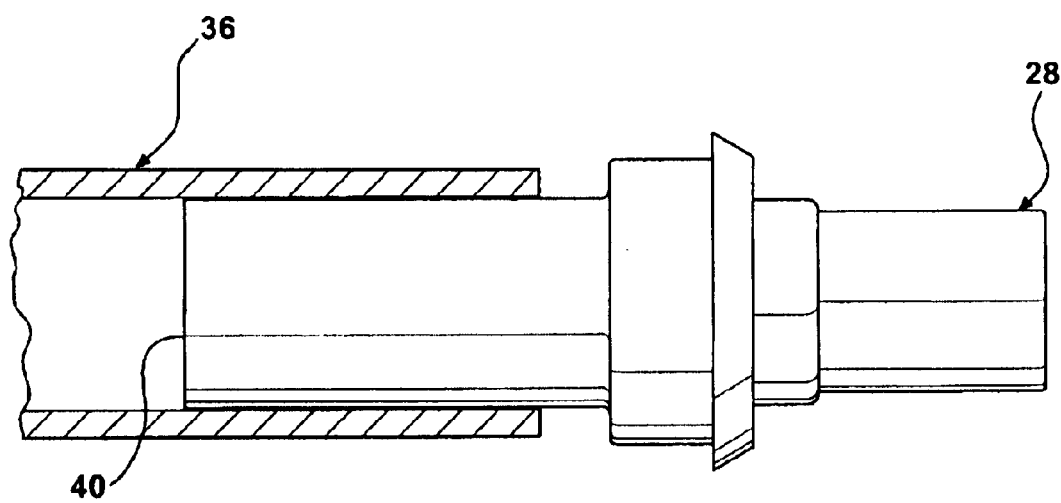
FIG. 5 is a partial cross sectional view of the rod and an inboard shaft in the recliner assembly.
Figure 6:
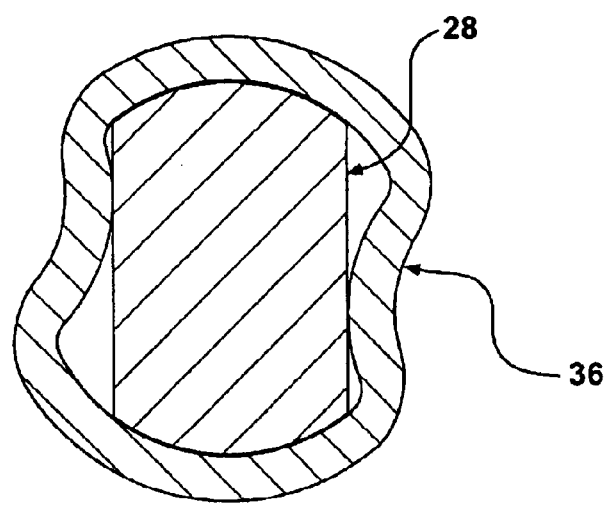
FIG. 6 is a partial cross sectional view of an inboard end of the rod and the inboard shaft.

Outboard and inboard shafts 26, 28 are each fixedly secured to the pawl in the outboard and inboard recliners 18, 20, respectively, for allowing external actuation of the pawls between the locked and unlocked positions. The outboard shaft 26 is generally cylindrical and extends axially inwardly towards the inboard recliner 20. A handle 29 is fixedly secured to the outboard shaft 26 for externally manually actuating the outboard shaft 26. As best shown in FIG. 3, the outboard shaft 26 includes a stepped locating edge 30. As best shown in FIGS. 5–8, the inboard shaft 28 extends axially towards the outboard recliner 18. The cross section of the inboard shaft 28 is defined by opposite and generally flat forward and rearward sides 32, 34 extending between symmetrically opposite and arcuate sides 33, 35. The outboard and inboard shafts 26, 28 are aligned axially.

Referring to FIGS. 2–8, a generally cylindrical rod 36 extends between the outboard and inboard shafts 26, 28 for synchronizing movement of the pawls in the outboard and inboard recliners 18, 20, respectively, between the locked and unlocked positions. More specifically, the rod 36 includes an outboard end 38 and an opening formed in the outboard end 38. A portion of the outboard shaft 26 extends through the opening in the outboard end 38 so that the outboard end 38 abuts the locating edge 30 of the outboard shaft 26. The outboard end 38 of the rod 36 is fixedly secured to the outboard shaft 26 by welding, or other suitable means, such as by crimping the rod 36 against the outboard shaft 26.

The rod 36 includes an inboard end 40 and an opening formed in the inboard end 40 for receiving a portion of the inboard shaft 28 therethrough. The cross section of the inboard end 40 of the rod 36 is defined by symmetrically opposite and arcuate sides 42, 44 extending between symmetrically opposite and inwardly opposing V-shaped forward and rearward sides 46, 48. Each of the forward and rearward sides 46, 48 are defined by an opening surface 50, 52 and a closing surface 54, 56. The opening surface 50, 52 and the closing surface 54, 56 intersect at a fulcrum 58, 60 at an angle. The opening surfaces 50, 52 of the forward and rearward sides 46, 48 are diametrically opposed. Similarly, the closing surfaces 54, 56 of the forward and rearward sides 46, 48 are diametrically opposed.

The inboard shaft 28 remains axially movable within the opening in the inboard end 40 of the rod 36 to accommodate variances in the relative positions between the outboard and inboard recliners 18, 20 due to build tolerances in the seat assembly 10 and the vehicle. The inboard shaft 28 is rotatably guided within the inboard end 40 by sliding engagement between the arcuate sides 33, 35 of the inboard shaft 28 and the arcuate sides 42, 44 of the rod 36. During clockwise and counterclockwise rotation of inboard shaft 28 within the inboard end 40, as viewed in the figures, each of the forward and rearward sides 32, 34 is toggled about the respective fulcrum 58, 60 between abutting engagement with the opening surface 50, 52 and the closing surface 54, 56, respectively.

Figure 7:
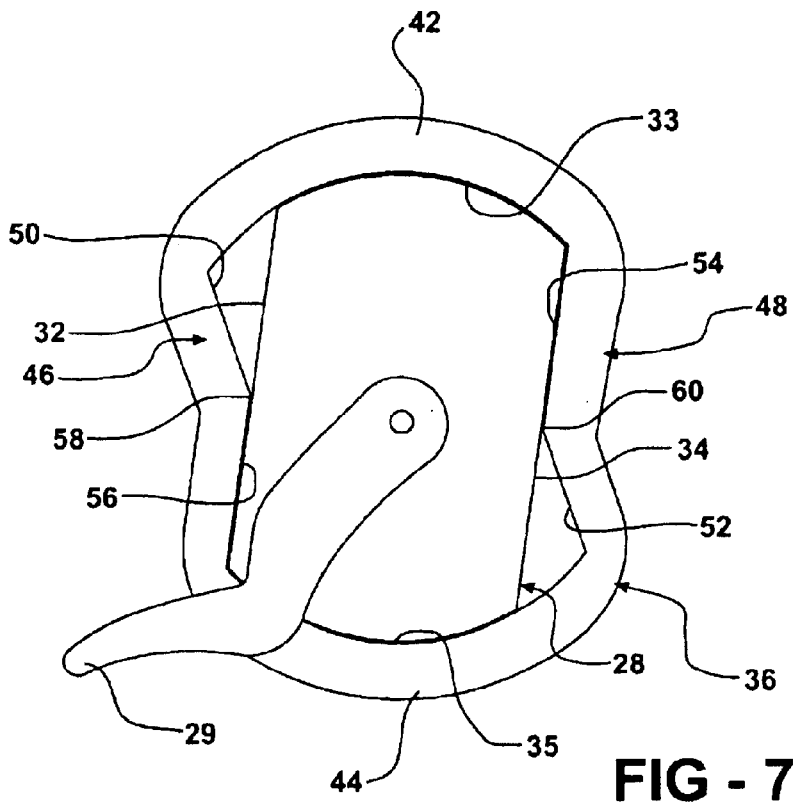
FIG. 7 is a partial cross sectional view of the inboard end of the rod and the inboard shaft in the locked position.
Figure 8:
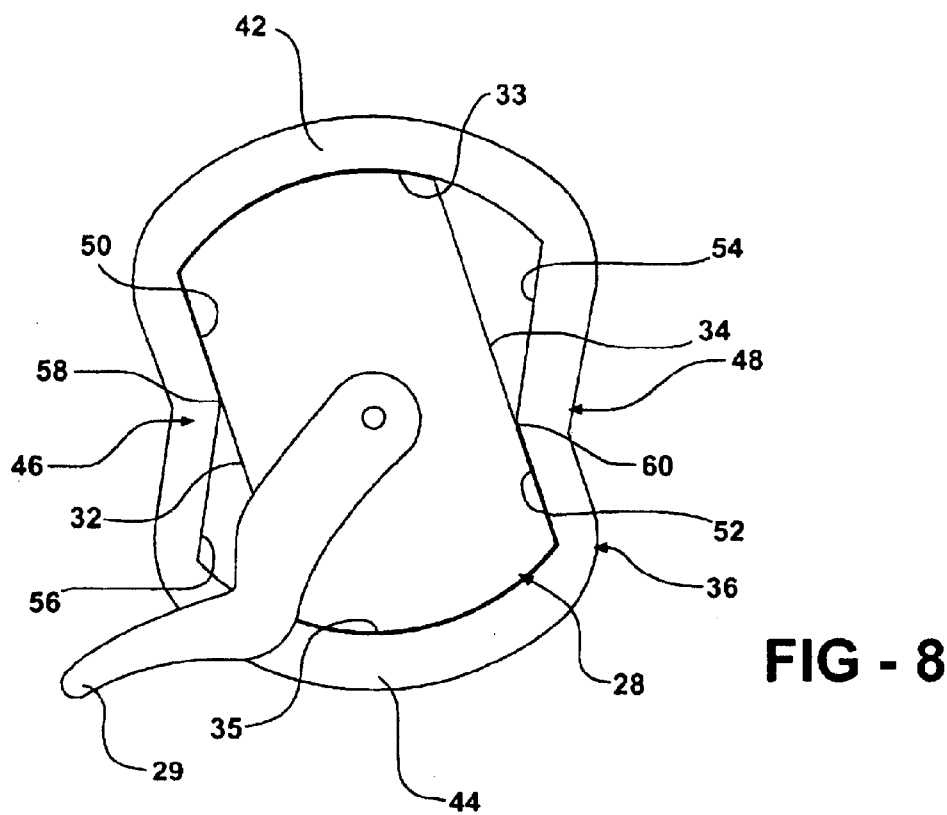
FIG. 8 is a partial cross sectional view of the inboard end of the rod and the inboard shaft in the unlocked position.

In operation, the pawls in the outboard and inboard recliners 18, 20 are continuously biased in the locked position to lock the angular position of the seat back 14 relative to the seat cushion 12 in any one of the plurality of reclined positions. When the pawls are in the locked position, the forward and rearward sides 32, 34 of the inboard shaft 28 are engaged with the closing surfaces 54, 56 of the inboard end 40 of the rod 36, as shown in FIG. 7. To adjust the angular position of the seat back 14, the pawls are manually moved to the unlocked position by rotating the handle 29 counterclockwise to the position shown in FIG. 8. The outboard shaft 26 rotates with the handle 29. The rod 36 rotates with the outboard shaft 26. The counterclockwise rotation of the handle 29 causes the inboard end 40 of the rod 36 to rotate counterclockwise relative to the inboard shaft 28. The inboard end 40 rotates about the inboard shaft 28. The opening surfaces 50, 52 move about the fulcrum point 58, 60 until then opening surfaces 50, 52 abut the respective forward and rearward sides 32, 34 of the inboards shaft 28. When the opening surfaces 50, 52 abut the forward and rearward sides 32, 34, as shown in FIG. 8, the continued counterclockwise rotation of the rod 36 causes the inboard shaft 28 to rotate counterclockwise with the rod 36. With the opening surfaces 50, 52 in abutment with the forward and rearward sides 32, 34, the outboard and inboard shafts 26, 28 rotate counterclockwise to move the pawls in the outboard and inboard recliners 18, 20 generally simultaneously to the unlocked position. The seat back 14 may be freely adjusted between the plurality of reclined positions. The handle 29 must be held in the position shown in FIG. 7 against the internal bias of the pawls toward the locked position.

After the seat back 14 has been adjusted to a desired one of the plurality of reclined positions, the pawls are allowed to return to the locked position. As the pawls return to the locked position, the outboard and inboard shafts 26, 28 rotate clockwise. The rod 36 rotates clockwise with the outboard shaft 26 until the pawl in the outboard recliner 18 reaches the locked position. Generally simultaneously with the outboard shaft 26, the inboard shaft 28 rotates clockwise until the forward and rearward sides 32, 34 engage the closing surfaces 54, 56 and the pawl in the inboard recliner 20 reaches the locked position. In the locked position, the pawls in the outboard and inboard recliners 18, 20 maintain the seat back 14 in the desired one of the plurality of reclined positions.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner assembly for a seat assembly in an automotive vehicle for providing pivotal adjustment and selective locking of a seat back relative to a seat cushion between a plurality of reclined positions comprising:

spaced apart outboard and inboard recliners each selectively movable between a locked position to lock the seat back in one of the plurality of reclined positions and an unlocked position to allow pivotal movement of the seat back relative to the seat cushion between the plurality of reclined positions;

opposing outboard and inboard shafts extending axially from said outboard and inboard recliners, respectively, for moving said outboard and inboard recliners between said locked and unlocked positions; and a rod extending between said outboard and inboard shafts for moving said outboard and inboard recliners together between said locked and unlocked positions, said rod slidably engaged with at least one of said outboard and inboard shafts for accommodating variance in the relative positions between said outboard and inboard recliners due to build tolerances in the seat assembly and the automotive vehicle.

2. A recliner assembly as set forth in claim 1 wherein said rod extends between an outboard end fixedly secured to said outboard shaft for rotational movement therewith and an inboard end axially slidably engaged with said inboard shaft to accommodate variance in the relative distance between said outboard and inboard recliner mechanisms due to build tolerances in the seat assembly and the automotive vehicle.

3. A recliner assembly as set forth in claim 2 wherein said inboard end of said rod includes a cross section having a V-shaped side extending between arcuate sides for rotatably receiving said inboard shaft therebetween.

4. A recliner assembly as set forth in claim 3 wherein said V-shaped side extends between an opening surface and a closing surface adjacent said opening surface, each of said opening and closing surfaces engagable with said inboard shaft for moving said inboard recliner between said unlocked and locked positions in response to movement of said outboard recliner between said unlocked and locked positions, respectively.

5. A recliner assembly as set forth in claim 4 wherein said opening and closing surfaces of said V-shaped side intersect at a fulcrum point about which said inboard shaft rotates between engagement with said opening and closing surfaces for moving said inboard recliner between said unlocked and locked positions in response to movement of said outboard recliner between said unlocked and locked positions, respectively.

6. A recliner assembly as set forth in claim 5 wherein said inboard shaft includes a flat surface movable about said fulcrum point during relative rotation between said inboard shaft and said rod for movement between engagement with said opening and closing surfaces for moving said inboard recliner between said unlocked and locked positions in response to movement of said outboard recliner between said unlocked and locked positions, respectively.

7. A recliner assembly as set forth in claim 6 wherein said cross section of said inboard end of said rod includes a plurality of V-shaped sides extending between arcuate sides for rotatably receiving said inboard shaft therebetween.

8. A recliner assembly as set forth in claim 7 wherein each of said plurality of V-shaped sides extends between an opening surface and a closing surface adjacent said opening surface, each of said opening and closing surfaces engagable with said inboard shaft for moving said inboard recliner between said unlocked and locked positions in response to movement of said outboard recliner between said unlocked and locked positions, respectively.

9. A recliner assembly as set forth in claim 8 wherein said opening and closing surfaces of each of said plurality of V-shaped sides intersect at one of a plurality of respective fulcrum point about which said inboard shaft rotates between engagement with said opening and closing surfaces for moving said inboard recliner between said unlocked and locked positions in response to movement of said outboard recliner between said unlocked and locked positions, respectively.

10. A recliner assembly as set forth in claim 9 wherein said inboard shaft includes a plurality of flat surfaces each movable about one of said plurality of respective fulcrum points during relative rotation between said inboard shaft and said rod between engagement with said respective opening and closing surfaces for moving said inboard recliner between said unlocked and locked positions in response to movement of said outboard recliner between said unlocked and locked positions, respectively.

* * * * *